(12) United States Patent
Chi et al.

(10) Patent No.: US 7,010,189 B2
(45) Date of Patent: Mar. 7, 2006

(54) OPTICAL MONITORING APPARATUS FOR USE IN WAVELENGTH DIVISION MULTIPLEXING NETWORK

(75) Inventors: Sien Chi, Hsinchu (TW); Chien-Chung Lee, Hualien (TW); Chien-Hung Yeh, Banciao (TW)

(73) Assignee: National Chiao Tung University, Hsinchu (TW)

( * ) Notice: Subject to any disclaimer, the term of this patent is extended or adjusted under 35 U.S.C. 154(b) by 78 days.

(21) Appl. No.: 10/679,218

(22) Filed: Oct. 3, 2003

(65) Prior Publication Data

US 2005/0074195 A1   Apr. 7, 2005

(51) Int. Cl.
*G02B 6/28* (2006.01)
*H04B 10/08* (2006.01)
*H04B 17/00* (2006.01)
*H04J 14/02* (2006.01)

(52) U.S. Cl. ............................. 385/24; 398/33; 398/37; 398/79; 398/82; 398/92

(58) Field of Classification Search ................. 398/33, 398/37, 79, 82, 92; 359/341.33, 337.11, 359/341.4, 341.41, 341.5, 337.1; 385/24
See application file for complete search history.

(56) References Cited

U.S. PATENT DOCUMENTS

| | | | | |
|---|---|---|---|---|
| 5,923,462 A | * | 7/1999 | van der Plaats | ......... 359/341.3 |
| 6,310,716 B1 | * | 10/2001 | Evans et al. | ................. 359/334 |
| 6,611,370 B1 | * | 8/2003 | Namiki et al. | ............... 359/334 |
| 6,640,027 B1 | * | 10/2003 | Kim et al. | ..................... 385/28 |
| 6,865,017 B1 | * | 3/2005 | Chen | ..................... 359/337.11 |
| 2004/0012843 A1 | * | 1/2004 | Aozasa et al. | ........... 359/337.1 |

* cited by examiner

*Primary Examiner*—Brian Healy
*Assistant Examiner*—Charlie Peng
(74) *Attorney, Agent, or Firm*—Apex Juris, pllc; Tracy M Heims

(57) ABSTRACT

An optical monitoring apparatus based on the scanning of the gain profile of erbium-doped fiber amplifiers (EDFA) and applied in a wavelength division multiplexing network has been proposed and experimentally demonstrated. The EDFA with an injected saturated tone can provide variable gain or loss profile by controlling the pump power. The components used in the present optical monitoring apparatus for use in a wavelength division multiplexing network are easily available and cost-effective, valuable for monitoring frequency and power of a WDM optical communication system, and capable of greatly enhancing resolution of monitoring frequency spectrum for the optical fiber network system.

6 Claims, 3 Drawing Sheets

OPTICAL MONITORING APPARATUS FOR USE IN WAVELENGTH DIVISION MULTIPLEXING NETWORK

BACKGROUND OF THE INVENTION

1. Field of the Invention

The present invention relates to an optical monitoring apparatus for use in a wavelength division multiplexing network, and more particularly to an optical monitoring apparatus based on the scanning of the gain profile of erbium-doped fiber amplifiers (EDFA) and applied in a wavelength division multiplexing network.

2. Description of the Prior Art

The wavelength division multiplexing (WDM) technology has been widely used to amplify bandwidth of an optical fiber network. In addition, such technology helps to enhance optical properties such as quality of the optical signals, channel characteristics and systematic monitoring performance, etc. In the prior art, spectrometers, wave measuring instruments, filters, tunable filters or Faber-Perot filters are employed to monitor optical signals. Theses instruments and the measuring ways using them are relatively expensive. Recently, some new technologies were developed to solve the problems. For example, these technologies comprise introducing a tracing wave to the system for a purpose of identifying wave channels or monitoring power thereof, monitoring semiconductor optical amplifiers or semiconductor laser diodes at the transporting locations of different wavelengths, or connecting a plurality of fiber Bragg grating (FBG) as wave channels of an optical sampling system. However, above-described prior art apparatuses are not perfect designs and have still many disadvantages to be solved. These apparatus are well known to a person skilled in the art and need not be further described in detail herein.

In views of the above-described disadvantages resulted from the conventional apparatuses, the applicant keeps on carving unflaggingly to develop a WDM-network optical monitoring apparatus according to the present invention through wholehearted experience and research.

SUMMARY OF THE INVENTION

It is an object of the present invention to provide an optical monitoring apparatus for use in a wavelength division multiplexing network to monitor power of signals transmitting in a fiber network by means of a simple architecture. This optical monitoring apparatus is very valuable for monitoring frequency and power in a wavelength division multiplexing network because the components used in the present optical monitoring apparatus are easily available and cost-effective.

It is another object of the present invention to provide an optical monitoring apparatus for use in a wavelength division multiplexing network, which is capable of greatly enhancing resolution of monitoring frequency spectrum for the optical fiber network system.

With respect to above mentioned advantages, the principle of the optical monitoring apparatus for use in a wavelength division multiplexing network is based on the scanning of the gain profile of erbium-doped fiber amplifiers (EDFA).

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The present invention provides a novel optical monitoring apparatus based on the scanning of the gain profile of erbium-doped fiber amplifiers (EDFA) and applied in a wavelength division multiplexing network. The present invention will become more clearly by the following detailed description.

For example, if the operating wavelength range of the system is divided into N equal bandwidths, the input power of the erbium-doped fiber amplifier at the nth bandwidth can indicated as $P_{in,n}(1 \leq n \leq N)$. The gain spectra of the erbium-doped fiber amplifier will be determined by the pump power $P_{pump}$. The relation between the input power and the output power of the erbium-doped fiber amplifier, i.e. gain, can be represented by $g_{m,n}(P_{pump,m})$, where m is the level of the pump power. If the output power for every bandwidth is indicated as $P_{out,m}$, the relation between the input power and the output power for every bandwidth can be represented by the formula (1):

$$P_{out,m} = \sum_{n=1}^{N} g_{m,n}(P_{pump,m}) \cdot P_{in,n}, \quad 1 \leq m \leq M \tag{1}$$

If M=N, the input power for every bandwidth can be represented by the formula (2):

$$\begin{bmatrix} P_{in,1} \\ P_{in,2} \\ \vdots \\ P_{in,N} \end{bmatrix} = \begin{bmatrix} g_{1,1} & g_{1,2} & \cdots & g_{1,N} \\ g_{2,1} & g_{2,2} & \cdots & g_{2,N} \\ \vdots & \vdots & \cdots & \vdots \\ g_{N,1} & g_{N,2} & \cdots & g_{N,N} \end{bmatrix}^{-1} \begin{bmatrix} P_{out,1} \\ P_{out,2} \\ \vdots \\ P_{out,N} \end{bmatrix} \tag{2}$$

However, the method for monitoring the WDM signal is performed by using gain spectra of erbium-doped fiber amplifiers related to pump power but independent of input power of light source. In accordance with the monitoring apparatus of the present invention, a saturated tone can be injected into the apparatus for a purpose of controlling gains of the erbium-doped fiber amplifier. Furthermore, the variable gain spectra of the WDM signal can also be achieved by scanning the gain profile.

Figure 1:
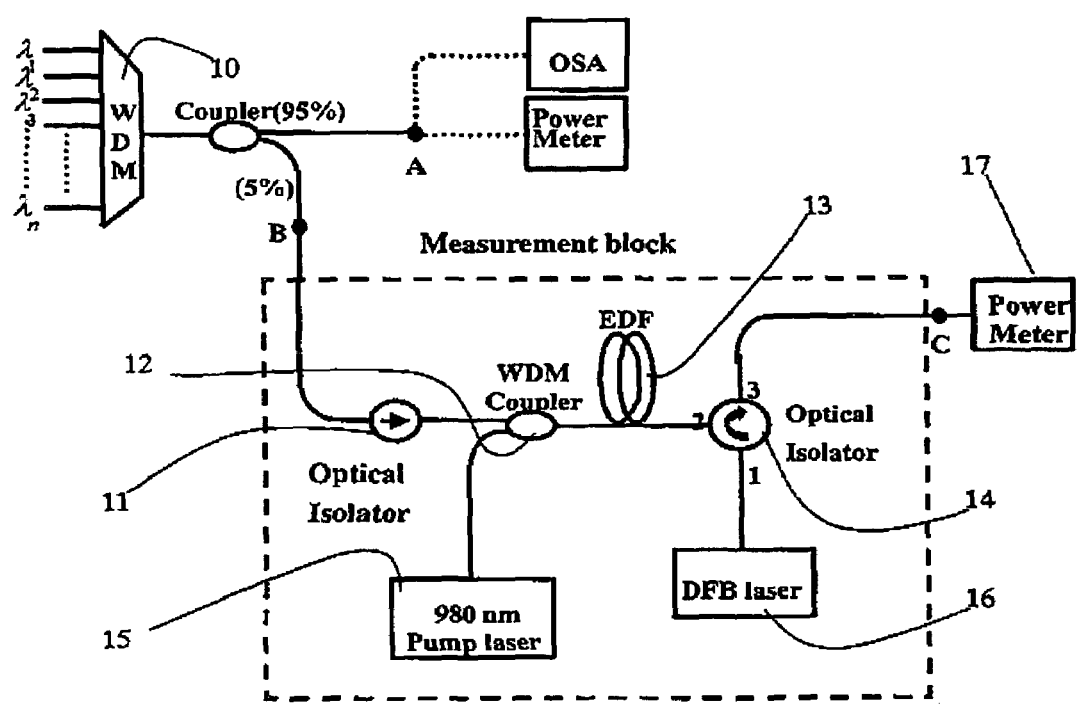
FIG. 1 is architecture of an optical monitoring apparatus for use in a wavelength division multiplexing network according to a preferred embodiment of the present invention.

FIG. 1 is architecture of an optical monitoring apparatus for use in a wavelength division multiplexing network according to a preferred embodiment of the present invention, which is used to detect a WDM signal 10 in a network system and comprises an optical isolator 11, a 980/1550 nm WDM coupler 12, an erbium-doped fiber (EDF) 13 of an appropriate length, an optical circulator 14, a 980 nm pump laser 15 and a saturated tone 16. The optical isolator 11 is employed to block the light reflected back to the system. The pump laser 15 can emit a laser with power greater than 100 mW. The WDM signal 10 is coupled with the 980 nm pump laser 15 in the WDM coupler 12 and then enters the erbium-doped fiber 13. The erbium-doped fiber 13 has a length of 6 meters (MP980) and is used to scan the gain profile of the WDM signal 10, to monitor the power of lights with a plurality of wavelengths on the WDM system. The gain profile can comprise gain or loss profile. The saturated tone 16 is preferably a DFB laser with a wavelength of 1540 nm and power of 15 dBm. However, the saturated tone 16 can be replaced by another light source as long as the gain profile can be controlled. The signal with a specified frequency is subsequently retrieved from the optical circulator 14 and sent into the power meter 17 for power measurement.

Figure 2:
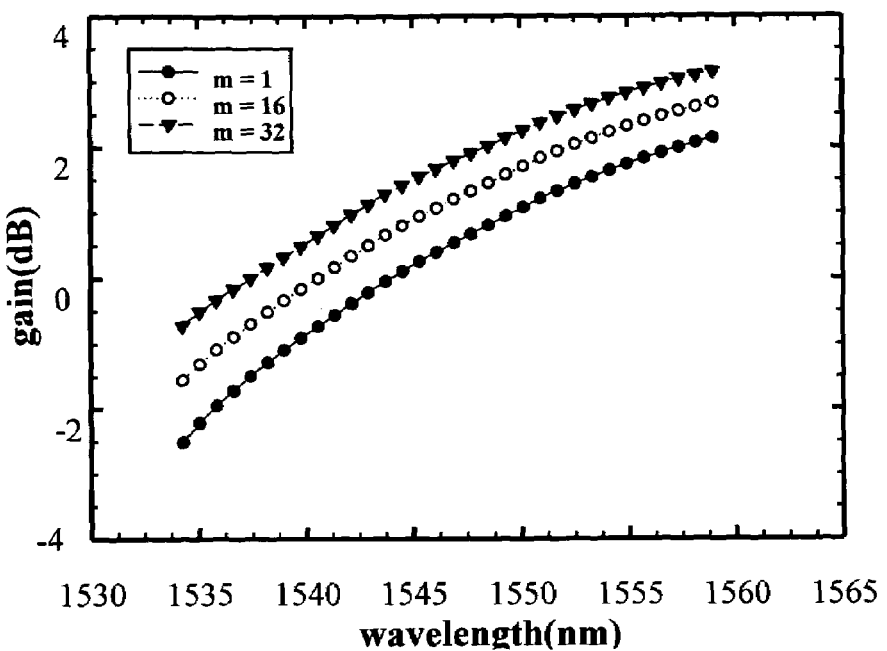
FIG. 2 is a plot showing gain spectra of 32-WDM test signals with power of −25 dB at different pump levels (m=1, 16 and 32)

In an embodiment, the operating wavelength of the WDM signal 10 ranges from 1534.25 nm to 1558.98 nm, and the wavelength range of the system is divided into 32 equal bandwidths (at intervals of 0.8 mm), which indicates N=32. The power of the pump laser 15 operates between 6 mW and 37 mW such that 32 pump level is generated, i.e. M=32. For a purpose of identifying practicability by scanning different gains, some relevant parameters are introduced to simulate the gain or input power spectra by commercial package software. FIG. 2 is a plot showing gain spectra of 32-WDM test signals with power of −25 dB at different pump levels (m=1, 16 and 32). The inverse matrix of formula (2) can be firstly obtained according to the detected input wavelength from 1534.25 nm to 1558.98 nm (at intervals of 0.8 nm) each having power of 25 dBm. Then, the original WDM signal can be deduced according to formula (2).

Figure 3:
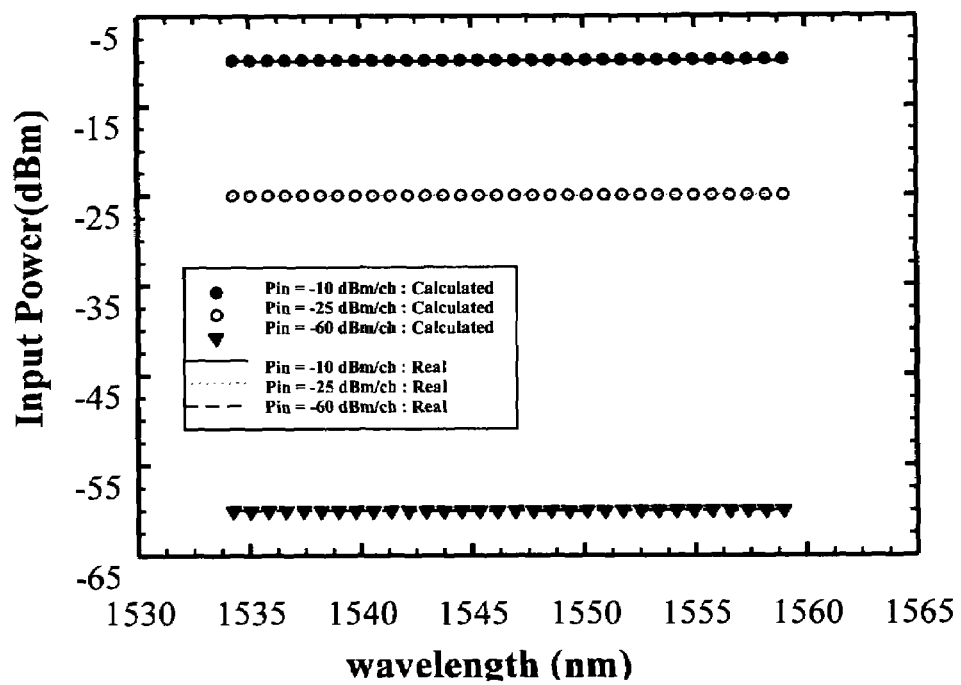
FIG. 3 is a plot showing real and calculated input power spectra of 32-WDM signals in a simulated situation at different input power (−10 dBm −25 dBm and −60 dBm)

As for the interpretation and calculation of the error and dynamic range, the present invention use different input power (−10 dBm, −25 dBm and −60 dBm) to simulate input power of 32-WDM signals. As can be seen in FIG. 3, when power of the total input WDM signals is 10 dB smaller than that of the saturated tone in order to control the gain profile of the optical amplifier, the measurement error is smaller than 0.14 dB. In other words, the calculated error smaller than 0.14 dB means that a dynamic range of 50 dB is achieved.

Figure 4:
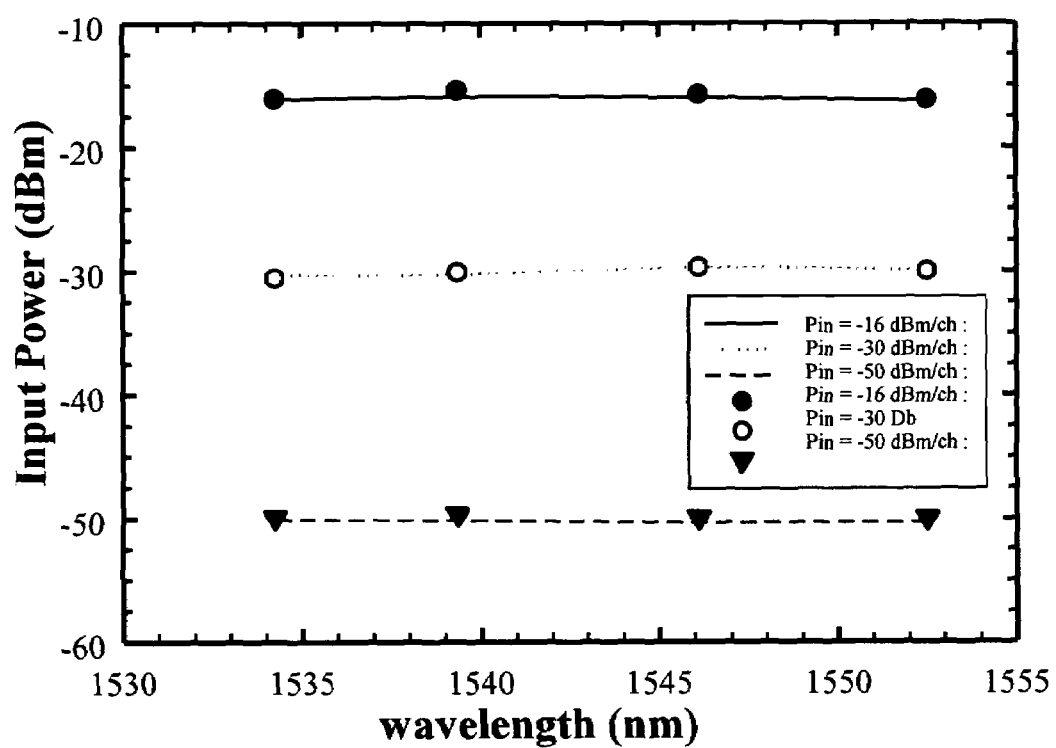
FIG. 4 is a plot showing real and calculated input power spectra of 32-WDM signals in an experimental situation at different input power (−16 dBm −30 dBm and −50 dBm).

In order to demonstrate accuracy of the process described above, a distributed feedback (DFB) laser is used as saturated tone of the present optical monitoring apparatus. The power and wavelength of this DFB laser are 0 dBm and 1540 nm, respectively. A 6-meter erbium-doped fiber (MP980) is used along with the 980 nm pump laser of 100 mW. The architecture of such optical monitoring apparatus is shown in FIG. 1. For example, the WDM signal to be detected by such apparatus has input power of −30 dBm and wavelength range of from 1534.25 nm to 1558.98 nm (at intervals of 0.8 mm). When the pump levels are changed from m=1 to m=32, i.e. the pump laser power of from 6 to 37 Mw, an inverse matrix of formula (2) is obtained accordingly. Furthermore, in the architecture of such optical monitoring apparatus, 4-WDM signals with wavelength of 1534.23 nm, 1539.35 nm, 1546.11 nm and 1552.50 nm (i.e. $\lambda 1$ to $\lambda 4$), respectively, are inputted into the apparatus and used as test signals. FIG. 4 is a plot showing real and calculated input power spectra of 32-WDM signals in an experimental situation at different input power (−16 dBm, −30 dBm and −50 dBm). When the test signals are operated at power of −16 dBm, −30 dBm and −50 dBm, the calculated errors for each channel are [0.10 dB, 0.53 dB, 0.29 dB, 0.16 dB], [−0.25 dB, 0.2 dB, 0.02 dB, −0.02 dB] and [0.17 dB, 0.55 dB, 0.43 dB, 0.39 dB], respectively. From the above results, the target measurement error smaller than 0.55 dB and the dynamic range of 34 dB are achieved.

From the above experiment, for a demonstration of four-channel WDM signals, the measurement error ≦0.55 dB, the sensitivity of −50 dBm and the dynamic range of 34 dB have been achieved. Therefore, the novel technology can enhance the function of the erbium-doped fiber amplifiers (EDFA) and optical monitoring apparatus in a WDM network.

The optical monitoring apparatus provided by the present invention has following advantages when compared with other prior art:

1. The components used in the present optical monitoring apparatus are easily available and cost-effective, which is very valuable for monitoring frequency and power in a WDM network.

2. The optical monitoring apparatus of the present invention based on the architecture of erbium-doped fiber amplifiers can widely applied to optical fiber network system and used to monitor signals transmitting in an optical network.

3. The optical monitoring apparatus of the present invention is advantageous for greatly enhancing resolution of monitoring frequency spectrum in the optical fiber network system.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An optical monitoring apparatus for use in a wavelength division multiplexing network for monitoring a wavelength division multiplexing (WDM) signal in a network system, comprising:
   a pump laser;
   a WDM coupler for coupling said WDM signal and said pump laser;
   an erbium-doped fiber that is 6 meters in length receiving said WDM signal and said pump laser transmitted from said WDM signal, and scanning gain profile of said WDM signal;
   a saturated tone light source for controlling said gain profile of said WDM signal;

an optical circulator coupled with said erbium-doped fiber, receiving said saturated tone light source, and subsequently outputting an output signal with a specified frequency; and wherein said saturated tone light source is a distributed feedback (DFB) laser with a wavelength of 1540 nm and power of 15 dBm.

2. The optical monitoring apparatus for use in a wavelength division multiplexing network according to claim 1 further comprising an optical isolator for blocking light reflected back to said network system.

3. The optical monitoring apparatus for use in a wavelength division multiplexing network according to claim 1 further comprising a power meter downstream of said optical circulator for power measurement.

4. The optical monitoring apparatus for use in a wavelength division multiplexing network according to claim 1, wherein said pump laser has a wavelength of 980 nm.

5. The optical monitoring apparatus for use in a wavelength division multiplexing network according to claim 1, wherein the operating wavelength of said WDM signal ranges from 1534.25 nm to 1558.98.

6. The optical monitoring apparatus for use in a wavelength division multiplexing network according to claim 1, wherein said gain profile comprises gain or loss profile.

* * * * *